Figure 1:
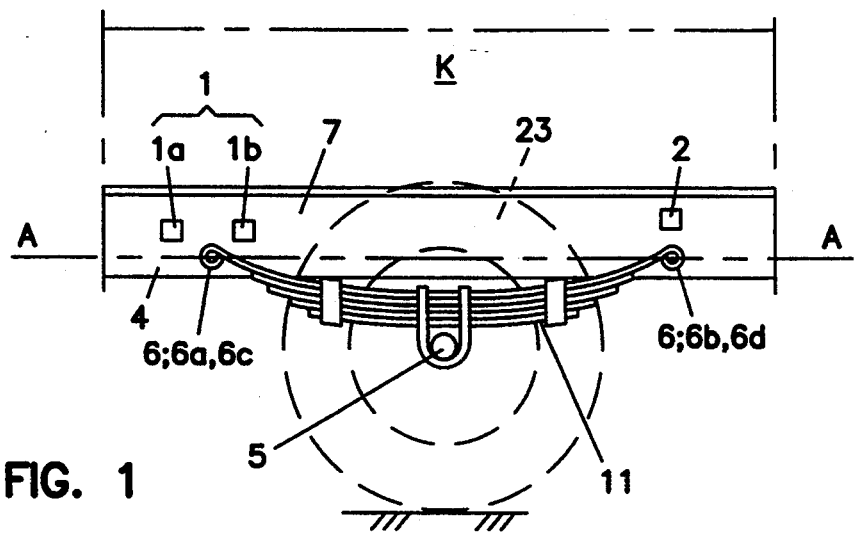

United States Patent [19]
Koivisto

[11] Patent Number: 5,366,033
[45] Date of Patent: Nov. 22, 1994

[54] PROCEDURE AND APPARATUS FOR THE WEIGHING OF A LOAD

[76] Inventor: Vesa Koivisto, Piiluvankatu 33 D 40, SF-53950 Lappeenranta, Finland

[21] Appl. No.: 956,879
[22] PCT Filed: May 29, 1991
[86] PCT No.: PCT/FI91/00171
§ 371 Date: Dec. 10, 1992
§ 102(e) Date: Dec. 10, 1992
[87] PCT Pub. No.: WO91/19172
PCT Pub. Date: Dec. 12, 1991

[30] Foreign Application Priority Data

May 30, 1990 [FI] Finland .................................. 902688
Aug. 30, 1990 [FI] Finland .................................. 904271

[51] Int. Cl.⁵ ........................................... G01G 19/08
[52] U.S. Cl. .................................................. 177/136
[58] Field of Search ............................... 177/136, 211

[56] References Cited

U.S. PATENT DOCUMENTS

| | | |
|---|---|---|
| 1,407,078 | 2/1922 | Murray ........................ 177/211 |
| 2,499,033 | 2/1950 | Oberholtzer ................. 177/211 |
| 3,322,220 | 5/1967 | Bash . |
| 3,734,216 | 5/1973 | Nordstrom et al. .......... 177/211 |
| 3,794,130 | 2/1974 | Malmgren et al. ............ 177/137 |
| 3,854,540 | 12/1974 | Holmstrom, Jr. . |
| 3,935,915 | 2/1976 | Seilly et al. .................. 177/136 |
| 3,960,228 | 6/1976 | Nordstrom ................... 177/211 |
| 4,148,369 | 4/1979 | Mercer, Jr. ................... 177/136 |
| 4,560,016 | 12/1985 | Ibanez et al. ................ 177/210 R |
| 4,673,047 | 6/1987 | Harbour . |
| 4,834,199 | 5/1989 | Bolland ......................... 177/211 |
| 4,884,644 | 12/1989 | Reichow ....................... 177/137 |

FOREIGN PATENT DOCUMENTS

| | | |
|---|---|---|
| 0072646 | 2/1983 | European Pat. Off. . |
| 0223384 | 5/1987 | European Pat. Off. . |
| 2554923 | 5/1985 | France . |
| 2229987 | 1/1974 | Germany . |
| 2043921 | 10/1980 | United Kingdom . |
| 2122748 | 1/1984 | United Kingdom . |

Primary Examiner—George H. Miller, Jr.
Attorney, Agent, or Firm—Merchant & Gould, Smith, Edell, Welter & Schmidt

[57] ABSTRACT

The invention concerns a procedure for the weighing of a load. In this procedure a load support having supporters (23), e.g. a vehicle or container, is provided with transducers (1a, 1b, 2) whose output signals are used to determine the weight of the load (K). According to the invention, the transducers are mounted on the rigid frame (4) of the load support near the fixing points (6; 6a, 6b, 6c, 6d) of the supporters (23; 27) and used to measure the deformations and/or stresses caused by the load, the weight of the load being determined on the basis of these.

5 Claims, 2 Drawing Sheets

PROCEDURE AND APPARATUS FOR THE WEIGHING OF A LOAD

The present invention relates to a procedure for weighing a load as defined in the introductory part of claim 1 and to an apparatus for weighing a load as defined in the introductory part of claim 2.

Previously known load-weighing methods use strain gauge transducers in the weighing of vehicles, especially lorries and their loads. Systems and equipment of this kind are presented e.g. in the following patent publications: GB-1366084, GB-1559596, GB-2122748, GB-2178178, U.S. Pat. Nos. 3443652, 3780817, 3800895, 3978908, 3889765 and 4673047.

However, the procedures and equipment proposed in these publications have certain drawbacks. They are complex and expensive and very difficult to install on vehicles already in use as the transducers are placed on the axle and suspension assemblies. Due to this placement of the transducers, these weighing equipments are very susceptible to damage.

The object of the present invention is to eliminate the drawbacks mentioned. A specific object of the invention is to present a new type of load-weighing procedure and apparatus which is applicable for the measurement of the weights of the loads of stationary and/or movable vehicles, transport containers and equivalent resting on supporters, and of load supports in general, in such manner that the weighing system is easy and economical to install even on vehicles or corresponding load supports already in use.

The procedure of the invention is characterized by what is presented in claim 1.

The apparatus of the invention is characterized by what is presented in claim 2.

In the procedure of the invention, a load support such as a vehicle or container having supporters such as legs or wheels is provided with transducers and the weight of the load is determined from the signals given by the transducers. According to the invention, the transducers are mounted on the rigid frame of the load support near the fixing points of the supporters, and they are used to measure the deformations and/or stresses caused by the load, the weight of the load being determined on the basis of these.

In a preferred embodiment of the procedure, a vehicle is provided with transducers and the weight of the load is determined from the signals given by the transducers. According to the invention, the transducers are mounted on the rigid frame of the vehicle, near the fulcrum points between the axles and the frame, and they are used to measure the deformations and/or stresses caused by the load, the weight of the load being determined on the basis of these.

The apparatus of the invention for the weighing of a load, which is placed on a load support provided with supporters, comprises at least one transducer attached to the load support, and a processing unit for processing the signals obtained from the transducers so as to enable the weight of the load to be detected. According to the invention, the transducers are mounted on the rigid frame of the load support, especially in the immediate vicinity of the fixing points of the supporters, said transducers measuring the deformations and/or stresses produced in the frame by the load.

A preferred embodiment of the apparatus comprises at least one transducer attached to a vehicle, and a processing unit for processing the signals obtained from the transducers so as to enable the weight of the load to be indicated. In this preferred embodiment of the invention, the transducers are mounted on the frame of the vehicle, specifically in the immediate vicinity of the fixing points of the axle assemblies, said transducers measuring the deformations and/or stresses produced in the frame by the load.

In an embodiment of the apparatus, the transducers are preferably mounted on the frame girders of the load support, e.g. a lorry.

In an embodiment of the apparatus, at least two transducers are mounted in the vicinity of each fixing point, e.g. point of suspension.

In an embodiment of the apparatus, the transducers are placed around the fulcrum of a joint turnable in the frame of a trailer.

In an embodiment of the apparatus, the transducers are attached tightly, e.g. by glueing, to the measuring points.

In an embodiment of the apparatus, it is provided with means for temperature compensation of the transducers.

In an embodiment of the apparatus, the transducers are strain gauges.

In an embodiment of the apparatus, the transducers are optoelectric transducers.

In an embodiment of the apparatus, the transducers are piezoelectric transducers.

The essential point in the procedure and apparatus of the invention is that the transducers are placed on rigid, fixed and strong parts of the load support, in positions suitably protected. The transducers are preferably placed above the fixing points of the supporters in such a way that they can measure small deformations of the load support frame caused by the load and its variations.

As compared to previously known techniques, the procedure and apparatus of the invention have the advantage that the transducers and the whole apparatus can be easily and quickly installed on lorries, containers and equivalent load supports, whether new or already in use. Mounted on the frame girders of a lorry or an equivalent load support, the transducers are not so exposed to impacts and wear as the transducers used in current equipment, and the simplicity of installation of the apparatus allows it to be installed on any vehicle regardless of model and size.

Figure 2:
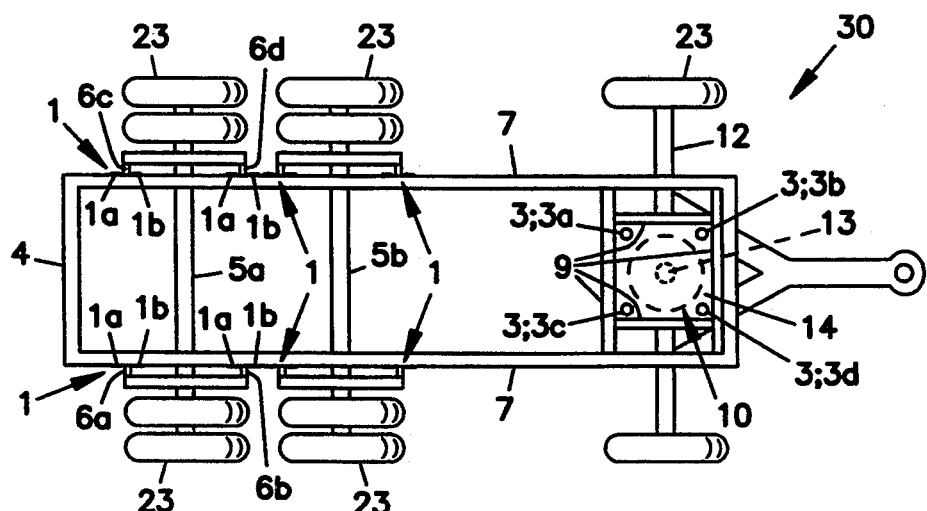
Figures 3A, 3B:
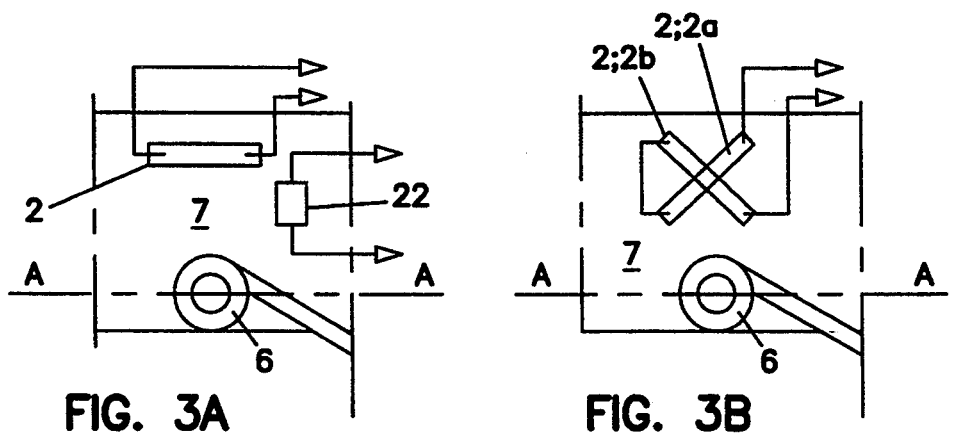
Figure 4:
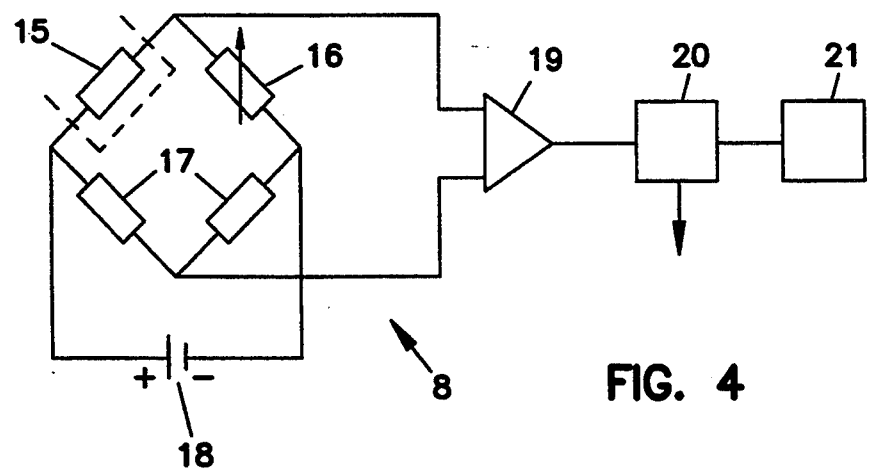
Figure 5:
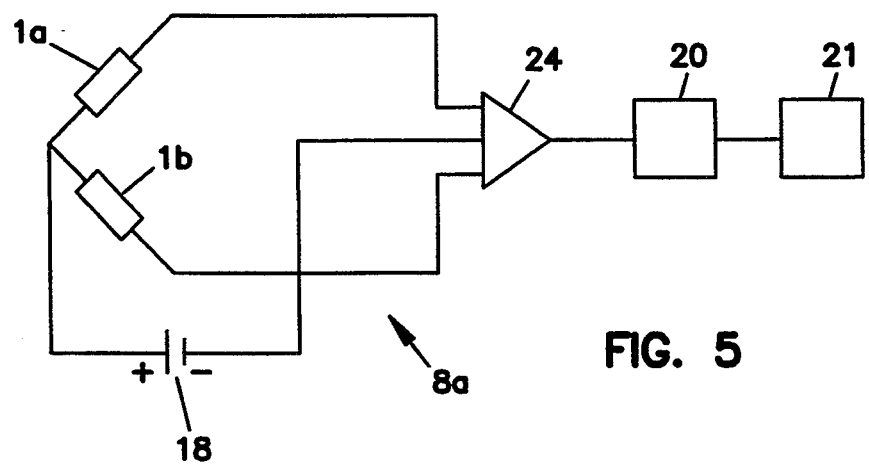
Figure 6:
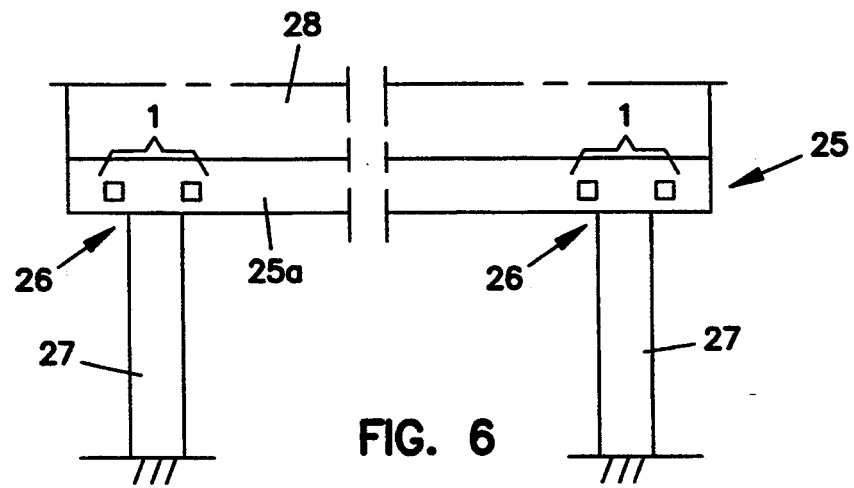

In the following, the invention is described in detail by referring to the appended drawing, in which:

FIG. 1 presents a diagrammatic lateral view of a transducer arrangement of the apparatus of the invention as mounted on the frame of a lorry, FIG. 2 presents a graphic top-view illustration of a trailer attachable to a traction vehicle, with the upper structures of the trailer frame removed, the transducer arrangement of the apparatus of the invention being installed on the trailer frame, FIG. 3a presents an arrangement for the attachment of a strain gauge to a rigid frame girder of a lorry or equivalent, FIG. 3b presents a similar arrangement for the attachment of two strain gauges, FIG. 4 presents the circuit diagram of an apparatus of the invention, FIG. 5 presents the circuit diagram of another apparatus of the invention, and FIG. 6 presents a diagrammatic lateral view of the transducer arrangement of an apparatus of the invention as mounted on a container standing on supporters.

FIG. 1 shows a transducer arrangement of the apparatus of the invention as mounted on the frame of a vehicle, e.g. a lorry. The axle assembly 5 and springs 11 of the vehicle are suspended on the frame girders 7 of the lorry only by the supporting points 6; 6a, 6b; 6c, 6d. Therefore, the stresses caused by the weight of vehicle frame 4 and the whole vehicle and its load K are applied to these supporting points 6 and through these and the axle assembly 5 and wheels 23 (indicated with broken lines) to the ground.

According to the invention, the frame girder 7 is provided with transducers 1; 1a, 1b and 2, e.g. strain gauges, mounted in the immediate vicinity of the supporting points 6. The transducers are used to measure the stresses applied to the frame 7 from the deformations caused by them. There may be one or more transducers 1, 2 around one and the same supporting point 6. They are connected to a common processing unit to give a measurement signal proportional to the load.

The transducers 1; 1a, 1b; 2 are placed above the supporting points 6; 6a, 6b; 6c, 6d, or more generally above the straight line A—A connecting the supporting points 6; 6a, 6b; 6c, 6d. In this way, the deformation, especially elongation, can be measured. The magnitude of the deformation depends on the magnitude of the load.

The rear axle assemblies 5a, 5b of the trailer in the embodiment of the invention illustrated in FIG. 2 are suspended on the frame 4 in a manner corresponding to FIG. 1. Two transducers 1a, 1b are mounted on the frame girders 7 near each supporting point 6a, 6b; 6c, 6d of each axle assembly 5a, 5b. The front axle 12 is turnably mounted on a supporting plate 14 by means of a joint 10 at the fulcrum point B. The supporting plate 14 is attached to the frame 4, e.g. frame girders 7, by means of brackets 9. Four transducers 3; 3a, 3b, 3c and 3d are placed symmetrically around the fulcrum or supporting point B of the joint, one pair of transducers 3a, 3b being placed on the right-hand side of the frame 4 relative to the fulcrum point B and another pair 3c, 3d on the left-hand side. The transducers 3 are used to measure the deformations of the supporting plate 14 when the trailer 30 is standing still, the stresses caused by the weight being measured from the deformations.

FIG. 3a illustrates the manner in which a strain gauge 2 is mounted on a frame girder 7 of a vehicle, a trailer or an equivalent load support. The strain gauge 2 is attached tightly, e.g. by glueing, to the upper edge of the frame girder 7 above the supporting point 6. In addition, the strain gauge 2 is fitted at a suitable location in the longitudinal direction A—A of the girder so that the small elongation produced by the load K in the frame girder in the region above the supporting point 6 is transmitted to the gauge and a measurement signal is obtained from it.

FIG. 3b shows how two strain gauges 2; 2a, 2b are mounted on a frame girder 7 corresponding to that in FIG. 3a. In this case, the strain gauges 2; 2a, 2b are attached in a crosswise manner to the upper edge of the girder 7 above the supporting point 6. Relative to the longitudinal direction of the girder 7, the strain gauges 2a, 2b are placed at an angle, preferably 45° and 135°, and at straight angles relative to each other. Electrically, the gauges are connected together in series and also to a suitable processing unit.

In the embodiment illustrated by FIG. 2, the transducers 1, 3 on each axle assembly 5a, 5b, 12 are connected in series and connected to a processing unit 8 according to the circuit diagram shown in FIG. 4, a separate processing unit 8 being provided for each axle assembly. By calibrating the equipment in a suitable manner, the loads imposed on each axle assembly can be measured separately. By combining these data e.g. by means of a microprocessor-based data processing apparatus, the total load and weight of the vehicle, among other things, are established.

FIG. 4 shows the circuit diagram of an apparatus according to the invention. The processing unit, 8 comprises a measuring circuit consisting of a measuring bridge made up of series-connected transducers 15 (e.g. transducers 6a, 6b, 6c and 6d on axle assembly 5a in FIG. 2), a variable resistor 16, two compensating resistors 17 and a d.c. source 18 connected across the bridge. By means of the variable resistor 17, the measuring bridge can be calibrated after installation as required for each vehicle. The d.c. signal obtained from the measuring bridge, representing the axle load of the vehicle being weighed, is summed and amplified by an amplifier 19, from where the signal is passed into a processing and controller unit 20. In this unit, the signal is converted into digital form by means of an A/D converter, processed and fed e.g. into a display 21. The measurement signal can also be output from the processing unit into a suitable data processing unit and/or stored in memory, from where it can easily be retrieved when necessary, e.g. along with other data relating to the load, such as the other axle loads of the vehicle.

In the apparatus of the invention, the transducers 1, 2, 3 are preferably temperature-compensated as the outside temperature varies considerably with the times of the year e.g. in Northern Europe. Without automatic compensation, the measurement results obtained from the transducers would vary significantly with temperature, or the apparatus would have to be calibrated each time the weather changes.

The temperature compensation is advantageously realized by means of a temperature transducer 22 (FIG. 3a), which is e.g. a resistor whose resistance varies with temperature. The temperature transducer 22 is connected to the processing unit 8, e.g. to the variable resistor 16 in the measuring bridge to vary its resistance in accordance with the changes in temperature.

FIG. 5 shows the circuit diagram of another apparatus of the invention. The processing unit 8a comprises a measuring circuit consisting of two transducers 1a, 1b, preferably optoelectric transducers, an amplifier 24, and a d.c. source 18 connected across the transducers and the amplifier. The optic transducer comprises a light source and a detector whose output signal represents the weight of the load under measurement. The signals obtained from the two transducers are fed into the amplifier 24, where they are summed and amplified. The amplified signal is then passed into a processing and controller unit 20. In this unit, the signal is converted into digital form by means of an A/D converter, processed and fed e.g. into a display 21. The optic transducers 1a, 1b are placed in the vicinity of the supporting points 6 of the vehicle or equivalent as shown e.g. in FIG. 1.

FIG. 6 presents a container 28 or an equivalent load support which can carry a load inside or upon it. The container 28 is supported by supporters 27. The rigid frame 25 of the container, specifically one of its rigid bottom girders 25a, is provided with a transducer arrangement according to the invention. The transducers 1a, 1b are mounted near the fixing points 26 of the supporters 27 in a manner corresponding to the embodiment in FIG. 1. This embodiment, too, may have one or more transducers 1a, 1b, 2 placed around one and the same fixing point and connected to a common processing unit to give a measurement signal proportional to the stress present at the fixing point and especially to the load K of the container.

In the embodiments described above, the transducers are strain gauges or optoelectic transducers. Other types of transducers measuring stress and/or deformation may also be used.

In an embodiment of the apparatus, piezoelectric transducers are used. The operation of this type of transducer is based on the piezoelectric effect. The transducer is a crystal made of a piezoelectric material such as quartz. Mechanical stress applied to the crystal generates a small potential difference between the ends of the crystal. A piezoelectric transducer is firmly attached e.g. to a frame girder of a vehicle in the manner presented e.g. in FIG. 3a. In this case, the transducer must be isolated from the frame girder. The potential difference across the transducer, which is proportional to the load K, is measured e.g. by means of a circuit arrangement as shown in FIG. 5.

In the foregoing, the invention has been described by referring to some of its preferred structural solutions, yet different embodiments are possible within the scope of the idea of the invention as defined in the following claims.

I claim:

1. A method for weighing a load in a vehicle such as a truck, a trailer or the like, in which method at least one strain gauge is mounted on a rigid frame, such as a frame girder, of the vehicle, wherein the strain gauge is used to measure deformation and stress of the rigid frame caused by the load, a weight of the load being determined on a basis of the measured deformation and stress, the method comprising the steps of:

mounting the strain gauge on the rigid frame, such as the frame girder, in a vicinity of a supporting point of an axle assembly in the frame girder;

mounting a second strain gauge in the vicinity of the supporting point, so that at least two strain gauges are placed in the vicinity of each supporting point;

applying the load on the truck; and measuring the deformation and stress of the rigid frame by the strain gauges.

2. An apparatus used for weighing a load in a vehicle such as a truck, a trailer or the like, the apparatus comprising:

at least one strain gauge being attached to a rigid frame, such as a frame girder, of the vehicle, the strain gauge being arranged to measure deformation and stress produced in the rigid frame by the load;

processing means, connected to the strain gauge, for processing a signal obtained from the strain gauge to indicate a weight of the load;

the strain gauge being attached to the rigid frame, such as the frame girder in the vicinity of a supporting point of an axle assembly in the frame girder; and a second strain gauge being attached to the rigid frame in the vicinity of the supporting point, so that at least two strain gauges are placed in the vicinity of each supporting point.

3. An apparatus according to claim 2, wherein the strain gauges are attached tightly, such as by gluing, to a measuring point.

4. An apparatus according to claim 2, further comprising means for compensating temperature of the strain gauges.

5. An apparatus according to claim 3, further comprising means for compensating temperature of the strain gauges.

* * * * *